Dec. 22, 1964  B. B. BECKER  3,162,317
MECHANISM FOR EXTENDING AND RETRACTING A LOAD SUPPORTING
MEMBER ON AN INDUSTRIAL TRUCK
Filed Oct. 25, 1962  4 Sheets-Sheet 1

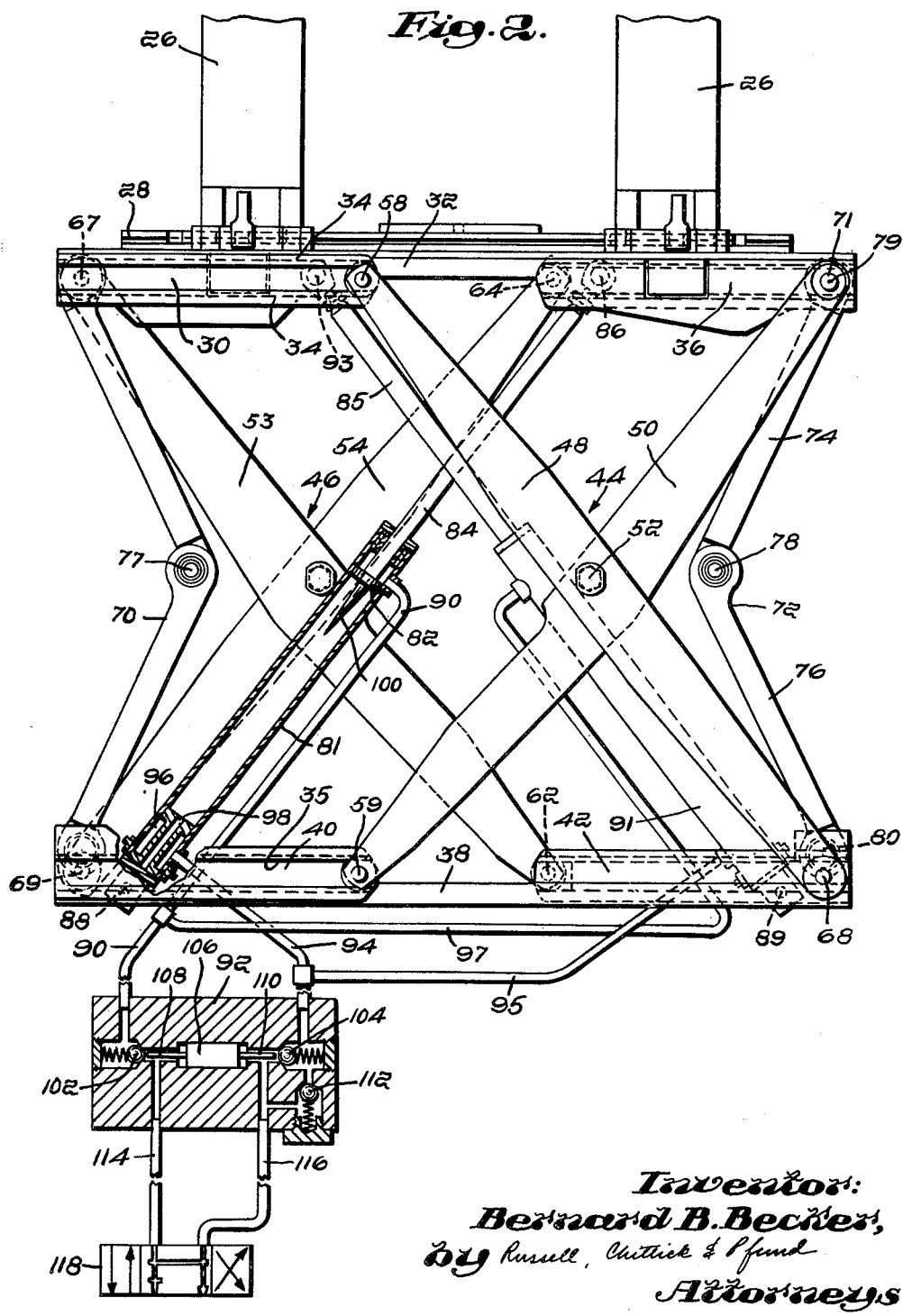

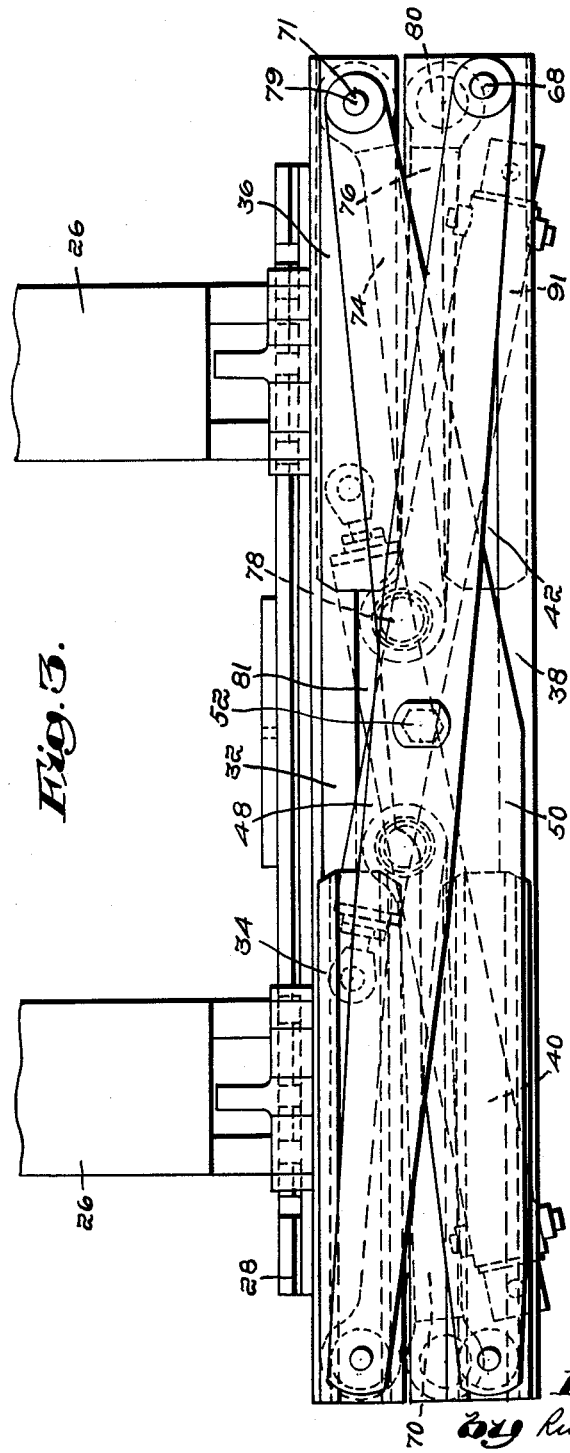

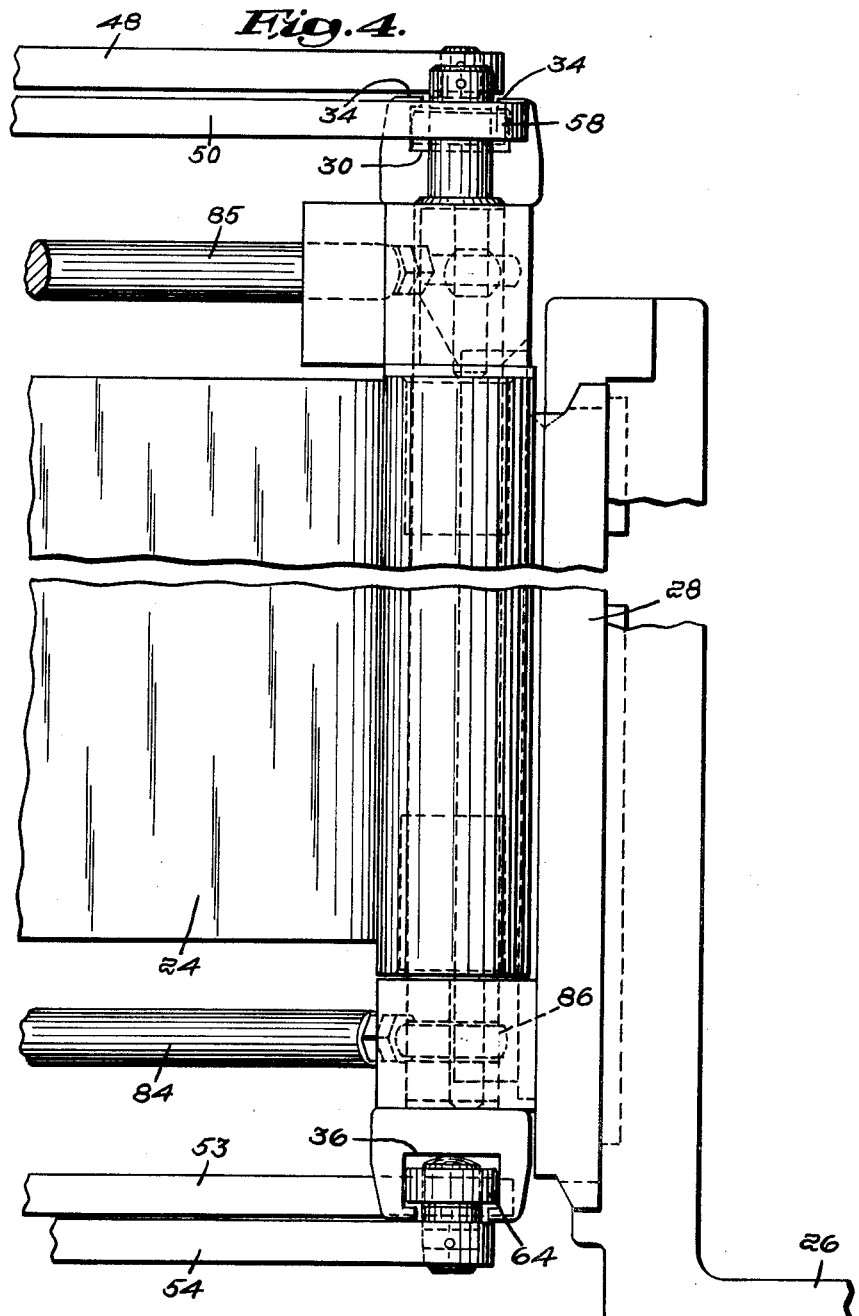

United States Patent Office 3,162,317
Patented Dec. 22, 1964

3,162,317
MECHANISM FOR EXTENDING AND RETRACTING A LOAD SUPPORTING MEMBER ON AN INDUSTRIAL TRUCK
Bernard B. Becker, Belmont, Mass., assignor to Lewis-Shepard Company, Watertown, Mass., a corporation of Massachusetts
Filed Oct. 25, 1962, Ser. No. 233,031
4 Claims. (Cl. 214—731)

This invention relates to a materials handling truck and more particularly to an improved extending and retracting load handling fork mechanism mounted thereon.

Industrial fork lift trucks, as they are commonly called, are generally required to operate in confined areas, as for example, narrow warehouse aisles. Materials stored in warehouses are commonly placed on pallets which are stacked one above another. This type of storage generally necessitates the moving of loads to and from locations having no adjacent unobstructed floor areas. This factor poses a two-fold problem in the design of an efficient materials handling truck.

First, the extending fork mechanism must be capable of extending a considerable horizontal distance. However, the greater the horizontal extension provided, the greater will be the effect of the cantilevered load upon the truck and upon the self-supporting extending members. Therefore, in view of the fact that loads of two tons or more are not unusual, the extension mechanism must be rigid with regard to vertical movement, yet easily movable horizontally toward and away from the truck.

Second, the extending and retracting mechanism must operate in true alignment so that complete parallelism is achived. This is, the plate on which the forks are mounted must mechanically maintain an attitude such that it remains parallel to the front of the truck throughout extension and retraction and also remains horizontally and vertically square thereto. This capability is necessary to ensure ease of entry of the fork into the pallets and ease of retraction of a load between closely placed adjacent load stacks. The availability of a materials handling truck that can reliably operate with such parallelism enables warehouse opertaors to stack loads more closely and thereby more efficiently utilize the storage space as well as to achieve safer working conditions with lower operator skill requirements.

Accordingly, it is an object of this invention to provide a materials handling truck which employs an extending fork mecahnism having vertically hinged facing side plates of a substantial vertical dimension which are adapted to withstand the heavy load weights, yet function smoothly during extension and retraction of the fork mechanism.

Another object of this invention is to provide a materials handling truck having a fork mechanism which is arranged to extend and retract by actuation of hydraulic cylinders and pistons while maintaining precise parallelism by means of upper and lower scissor-type pivoted arms which are hereinafter referred to as pantographs.

A further object is to provide a materials handling truck with an extending fork mechanism so constructed that there is no need for intermediate connecting linkages having high lever ratios and load carrying pivot bearings which due to deflection and wear tend to introduce side sway twisting and looseness into the extension mechanism.

A further object of this invention is to provide a material handling truck with an extending fork mechanism having a small vertical dimension to maximize the height at which the fork lifts can operate.

A still further object of this invention is to provide a materials handling truck having a fork lift mechanism structurally capable of absorbing a heavy blow against the forks and fork-supporting plate such as may occur when the operator fails to stop the truck when maneuvering in close quarters.

Other objects an advantages of the invention will become apparent from a study of the accompanying drawings and descriptive matter in which is illustrated and described a preferred embodiment of the invention.

In the drawings:

FIG. 2 is a top plan view of the extending fork mechanism in the fully extended position including a schematic representation of the hydraulic system which energizes the piston cylinders;

FIG. 3 is a top plan view of the extending fork mechanism in the fully retracted position; and FIG. 4 is a side elevational view of the forward portion of the extending fork mechanism.

Figure 1:
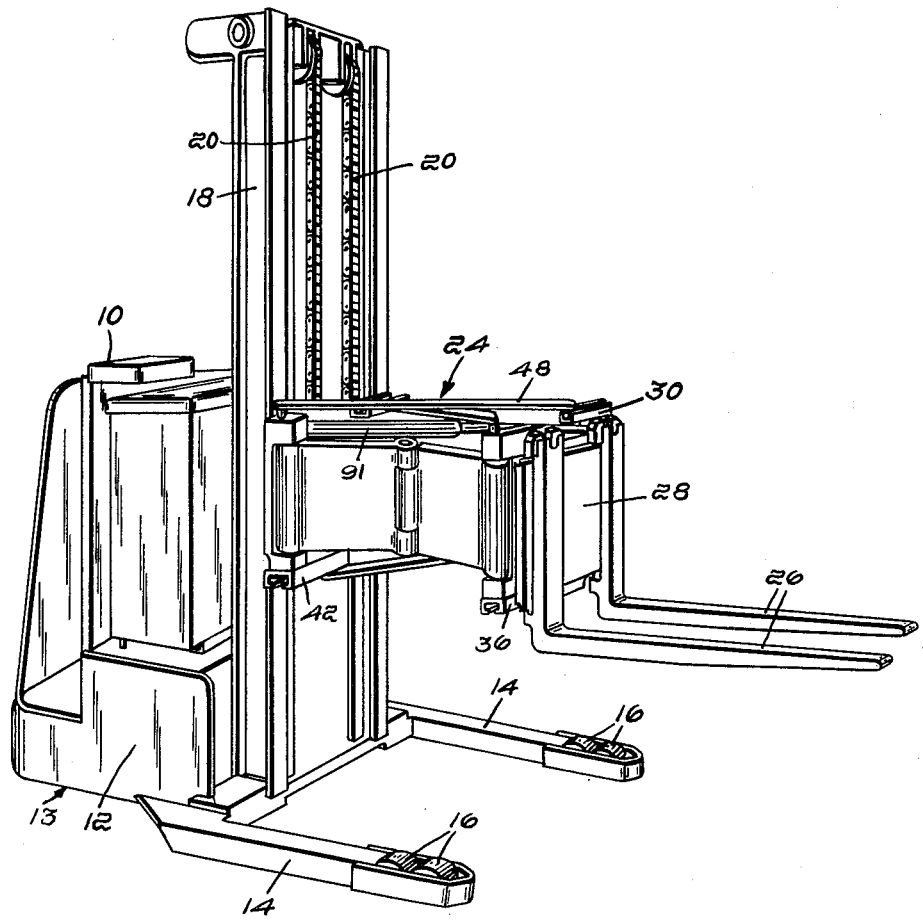
FIG. 1 is a view in perspective of the materials handling truck incorporating the invention.

Referring now more particularly to the drawings, the materials handling truck illustrated in FIG. 1 will be recognized as being conventional in several respects. The unit has a driver's control station 10 from which the truck is steered and operated with controls (not shown). A motor housing 12 mounted on truck base 13 encloses a motor, usually electric (not shown) and batteries (not shown) which energize the electric motor. The truck is stabilized by forwardly extending legs 14 which house roller wheels 16 that cooperate with a steerable driving wheel (not shown) located beneath driver's control station 10. A vertical mast 18 is affixed to and arises from truck base 13 and includes chain lifts 20 operated in conventional manner for raising and lowering the extending fork mechanism which constitutes the present invention and is generally indicated at 24. This mechanism carries a pair of forks 26 on a mounting plate 28. This type of materials handling truck is commonly employed for stacking operations in warehouse type facilities. The operation of such trucks is well known and the particular means by which the entire unit is steered and controlled as well as the means by which the fork extending mechanism is raised and lowered by the chain lifts is conventional and does not form a part of the present invention. Accordingly, it is not necessary here to set forth the constructiont hereof in detail; as will appear, the extending fork mechanism is independently constructed and operated.

Referring now to FIG. 2, the entire extending fork mechanism 24 can be seen in a top view. The forks 26 are removably affixed to a vertical mounting plate 28. The removable feature is provided so that when non-palletized cargo is being moved, other types of gripping devices, such as vertically facing, laterally movable squeeze plates, can be substituted for the forks 26.

The front plate 32 is maintained in parallelism with the mast 18 through the use of a pair of pantographs generally indicated at 44 and 46 in FIGS. 1 and 2. The pantograph structure includes; an upper slide channel 30 which is provided atop front plate 32 and adjacent the left edge thereof. Slide channel 30 has a lateral slot extending its entire length with top retaining lips 34 which can also be seen in FIG. 4. A lower slide channel 36 of the same configuration as upper slide channel 30, but in inverted position, is located beneath and affixed to the right bottom edge of front plate 32. A rear plate 38 is mounted upon vertical mast 18 and is vertically movable by means of chain lifts 20. Mounted upon the top of rear plate 38 and adjacent the left edge thereof is upper slide channel 40 identical to upper slide channel 30. Mounted beneath the right bottom edge of rear plate 38 is lower slide channel 42, identical to lower slide channel 36. Upper pantograph 44 and lower pantograph 46 are identical pivoted arm assemblies spanning and connecting front plate 32 and rear plate 38 at their top and bottom. Upper pantograph 44 consists of two crossed pantograph arms 48 and 50 pivoted at 52 and cooperating in a scissor-like manner. Lower pantograph 46 has similar pivoted arms 53 and 54 and operates in like manner. Since the forces acting upon the pantographs are horizontally directed, the pivoted arms may be relatively thin in their vertical dimension while quite substantial in their horizontal dimension so as to provide a strong, compact, easily closeable, positive control.

The upper pantograph arms 48 and 50 are pivotally affixed to plates 32 and 38 at 71 and 68 respectively. The other ends of arms 48 and 50 have channel wheels 58 and 59 mounted thereon which are arranged to move laterally within slide channels 30 and 40, being confined therein by the retaining lips 34 and 35.

The lower pantograph 46 is mounted on 32 and 38 in a similar, but reversed fashion in that arms 53 and 54 are pivotally secured at 67 and 69 to plates 32 and 38. Wheels 62 and 64 at the other ends of arms 53 and 54 reside in lower slide channels 42 and 36.

As the plates 32 and 38 are moved toward or away from each other by means which will be described hereinafter, the two pantographs maintain the plates in parallel relation.

Closely associated with the functioning of the pantographs are relatively massive vertically hinged side plate assemblies 70 and 72 which bear the weight of the load carried by forks 26. The plate assemblies are shown in the fully extended position in FIG. 2 and in the fully retracted position in FIG. 3. Plate assembly 72 is comprised of a forward plate 74 and a rearward plate 76 joined by hinge pin 78 which extends through the entire vertical dimension of plate assembly 72. Forward plate 74 is rotatably connected to front plate 32 by pin 79. Rearward plate 76 is rotatably connected to rear plate 38 by pin 80. Plate assembly 70 is similarly constructed with hinge pin 77. The plate assemblies are designed to have a vertical dimension substantially equal to the height of the front and rear plates and hinge pins of generous diameter in order to be able to withstand and absorb the twisting forces generated by the cantilevered loads carried by the forks at varying distances from the truck. By this arrangement, the pantograph assemblies are unaffected by the loads and can expand and retract to maintain plates 32 and 38 parallel. As can be seen from FIGS. 2 and 3, the hinged movement during retraction of plate assemblies 70 and 72 swings the hinge pins 77 and 78 inwardly thus avoiding any increase in the lateral dimension of the truck.

The front plate 32 and forks 26 are moved toward and away from the truck by a pair of simultaneously actuated hydraulic cylinders and pistons. One cylinder is located just above pantograph 46 and the other just below pantograph 44. As can be seen in FIG. 2, lower cylinder 81, shown in horizontal section, houses a piston 82 and a piston rod 84 integral therewith which extends through the forward end of cylinder 81. Piston rod 84 is pivotally affixed at its forward end to front plate 32 by means of piston rod pin 86. Cylinder 81 is attached at its rear end to rear plate 38 by means of cylinder pin 88. A flexible hydraulic line 90 leads from the piston rod side of cylinder 81 to the valve assembly 92 and another flexible hydraulic line 94 connects the other side of cylinder 81 to valve assembly 92 which is shown diagrammatically in FIG. 2. A dash pot 96 is located within cylinder 81 and is inteposed between the interior of cylinder 81 and the entrance opening of hydraulic line 94 for the purpose of slowing the motion of piston 82 as it approaches the rear end of cylinder 81 during retraction and to prevent the rapid movement of piston 82 when it begins its travel during extension. Dash pot 96 has a longitudinal bore 98 which is oriented to receive the conical nose 100 of piston 82. Upper cylinder 91, similar to cylinder 81, is affixed in a diagonally opposite direction to the rear plate at 89 and has a piston rod 85 attached to the front plate at 93. Flexible hoses 90, 94, 95 and 97 are fed from the same valve assembly 92 so that as high pressure fluid flows through the lines, the pistons move equally and simultaneously.

The valve assembly 92 is comprised of two opposed spring loaded one-way valves 102 and 104 flanking a piston 106 having projecting push rods 108 and 110. A high pressure relief valve 112 is provided and services hydraulic lines 94 and 95. Relief valve 112 is spring loaded so as to remain in closed position when subjected to the normal extending and retracting pressures of less than approximately 3000 p.s.i. Higher pressures open valve 112 which vents through connecting line 116 into the pump reservoir. Hydraulic connecting lines 114 and 116 lead from valves 102 and 104 to pump and control valve assembly 118 (shown diagrammatically).

*Operation*

Under normal conditions of use, the operator moves the unloaded materials handling truck along the warehouse aisle with the extending fork mechanism fully retracted, as shown in FIG. 3, in order to provide the truck with maximum maneuverability. The pump and control valve assembly 118 is a hydraulically actuated control having three positions; retract, neutral and extend. In the retract position, hydraulic pressure is applied through connecting line 114. In the neutral position, no pressure differential exists. In the extend position, pressure is applied through connecting line 116. Accordingly, when the truck reaches the location of the load, the extending fork mechanism is positioned at the desired height on vertical mast 18 by means of chain lifts 20. Then the control valve assembly 118 is shifted from neutral to extend. This causes hydraulic pressure to be applied through connecting line 116. Valve 104 opens and the oil is pumped through lines 94 and 95 and enters dash pots 96 of cylinders 81 and 91. Pressure is exerted on conical noses 100 of the pistons 82 which, in the retracted position of FIG. 3, abut dash pots 96. For ease of illustration, only the operation of cylinder 81 and lower pantograph 46 will now be described, but is to be understood that cylinder 91 and upper pantograph 44 operate identically and cooperatively.

The force initially exerted on piston 82, for a given pressure, is proportional to the projected area of the conical nose 100 which is exposed to the pressure. It can thus be seen that the function of dash pot 96 during the extension phase is to allow only a small surface area of conical nose 100 to be exposed initially and to permit the exposed area to increase as conical nose 100 leaves the dash pot. The requirement of a dash pot stems from the fact that cylinder 81 lies substantially parallel to rear plate 38 in the retracted position shown in FIG. 3. It is obvious that from this position, the initial extending movement of piston rod 84 from within cylinder 81 will produce proportionately greater separation between rear plate 38 and front plate 32 than will an equal length of subsequent piston rod extension. This is because of the triangular relationship which exists between the piston rod and cylinder (hypotenuse), the rear plate (base leg) and the distance between the plates (vertical leg) whereby the ratio between the lengths of the hypotenuse and the vertical leg is high in the retracted position and approaches unity in the extended position. Therefore, dash pot 96 allows only a restricted oil flow force to act on conical nose 100 initially to compensate for the high ratio of plate separation to piston movement.

The hydraulic pressure then acts fully on piston 82 forcing it down the length of cylinder 81. The hydraulic fluid in the piston rod portion of cylinder 81 is caused to flow into hydraulic line 90 and through valve 102 which has been opened by push rod 108. The fluid then returns via connecting line 114 to the reservoir (not shown) of pump and control valve assembly 118.

To retract the forks 26, the control valves 118 are reversed and hydraulic fluid is caused to flow from pump and control valve assembly 118 through line 114, valve 102, line 90 and into the piston rod portion of cylinder 81, driving piston 82 rearward. The displaced fluid in the rear portion of cylinder 81 flows through dash pot 96, line 94, valve 104 (which has been opened by push rod 110), line 116 and into the pump reservoir (not shown). Dash pot 96 operates to retard the movement of piston 82 in its last several inches of travel by restricting the outflow and creating an oil cushion in the path of travel of conical nose 100.

Another feature of the construction of valve assembly 92 is the presence of relief valve 112 and its connecting hydraulic lines which are provided for the purpose of protecting the hydraulic system from the shock surges created when the forks or plates 32 contact a relatively immovable object. When this happens the piston rod 84 is suddenly stopped or jammed to the rear and very high pressures are generated in the rear section of cylinder 81. Because valve 104 is closed, the pressure surge is vented through valve 112 and connecting line 116 into the pump reservoir and the low pressure created in the piston rod portion of cylinder 81 is built up to normal by fluid moving from pump and control valve assembly 118 through valve 102 (which has opened due to the unequal pressure) and line 90.

Referring now to the motion of the pantographs 44 and 46, it will be seen that absolute parallelism is maintained during extension and retraction. That is, the pantographs are connected in such a fashion that the opposing scissors actions of the two pantographs co-operate to maintain the front plate 32 and rear plate 38 in parallel relationship throughout the entire retraction and extension operations. It will also be noted that the amount of separation between the front and rear plates is limited solely by the amount of piston travel possible before the piston contacts either the forward cylinder end or the dash pot. Therefore, no other stop means are required.

While one embodiment of the invention has been shown in the specification and drawings, it should be understood that changes and modifications may be resorted to in keeping with the spirit of the invention as defined by the appended claims.

I claim:

1. A materials handling truck having in combination: a mobile truck base having stabilizing legs with wheels housed therein; a power source contained within said truck base; a vertical mast affixed to said truck base and extending therefrom; elevational means housed by said vertical mast and arranged to be driven by said power source; a rear backing plate mounted upon said elevational means and adapted to be raised and lowered upon said vertical mast; a front plate disposed parallel to said rear plate and having a load carrying means attached thereto; side hinges having vertical hinge pins, said side hinges pivotally pinned to said front and rear plates and adapted to retract and extend said front plate toward and away from said rear plate, said side hinges bearing the stress transmitted by said load carrying means; hydraulic actuating cylinders having pistons and piston rods therein, said cylinders and piston rods disposed between said front and rear plates and affixed thereto, means for operating said actuating cylinders to extend and retract said front plate relative to said rear plate; and upper and lower pivoted arm pantograph assemblies disposed between said front and rear plates, each said pantograph assembly having a pair of pivoted arms affixed at two ends thereof and slidably engaged at the other two ends thereof to said front and rear plates whereby said pantograph assemblies cooperate to maintain said plates in continuous parallel relationship during extension and retraction.

2. A materials handling truck comprising: a mobile truck base; a vertical mast affixed to said truck base and extending upwardly therefrom; elevational means housed by said vertical mast having a rear plate mounted thereon; a front plate having load carrying means attached thereto; side hinges having vertical hinge pins, said side hinges pivotally attached to said rear and front plates and arranged to bear the weight transferred from said load carrying means; upper and lower pivoted arm assemblies, each said assembly having crossed pivoted arms horizontally disposed in scissors-fashion between said rear and front plates, said pivoted arms being pivotally attached and slidably engaged to said rear and front plates to maintain said plates continuously in a parallel relationship; and means for extending and retracting said front plate relative to said rear plate, said means pivotally attached to and extending between said front plate and said rear plate.

3. A materials handling truck having in combination: a mobile truck base; a vertical mast affixed to said truck base and extending upwardly therefrom; a rear plate mounted on said vertical mast; means for raising and lowering said rear plate on said vertical mast; a front plate spaced from and disposed parallel to said rear plate having load carrying means attached thereto; side hinges having vertical hinge pins pivotally attached between said front and rear plates and adapted to retract and extend said front plate towards and away from said rear plate, said side hinges bearing the stress transmitted by said load carrying means; upper and lower pivoted arm pantograph assemblies disposed between said front and rear plates, each said pantograph assembly having crossed pivoted arms disposed between said front and rear plates to maintain said plates in parallel relationship, one of said crossed arms having an end thereof pivotally attached to said front plate and its other end in slidable engagement with said rear plate, and the other of said crossed arms having an end thereof pivotally attached to said rear plate and its other end in slidable engagement with said front plate; and hydraulic actuating cylinders having pistons therein, said cylinders disposed between and pivotally attached to said front and rear plates, whereby actuation of said cylinders extends and retracts said front plate relative to said rear plate, said plates being maintained in a parallel relationship during said extension and retraction.

4. A materials handling truck comprising: a mobile truck base; a vertical mast affixed to said truck base and extending upwardly therefrom; elevational means housed in said vertical mast having a rear plate mounted thereon; a front plate spaced from said rear plate and having load carrying means attached thereto; side hinges having vertical hinge pins, said side hinges pivotally attached to said front and rear plates and arranged to support the weight transferred from said load carrying means; a pivoted arm pantograph assembly extending between said front and rear plates, said pantograph assembly being pivotally attached and slidably engaged to said front and rear plates to maintain said plates continuously in parallel alignment; and actuating means for extending and retracting said front plate relative to said rear plate, said actuating means attached to and extending between said front plate and said rear plate.

References Cited by the Examiner

UNITED STATES PATENTS

| | | | |
|---|---|---|---|
| 2,975,923 | 3/61 | Ulinski | 214—730 |
| 3,024,738 | 3/62 | O'Toole | 248—421 |
| 3,034,765 | 5/62 | Ludowici | 187—18 |
| 3,142,400 | 7/64 | Garnich | 214—730 |

FOREIGN PATENTS 1,221,403  6/60  France.

HUGO O. SCHULZ, *Primary Examiner.*

MORRIS TEMIN, *Examiner.*